(12) United States Patent
Guthrie et al.

(10) Patent No.: US 6,385,661 B1
(45) Date of Patent: May 7, 2002

(54) SYSTEM AND METHOD FOR DYNAMIC GENERATION OF REMOTE PROXIES

(75) Inventors: Rhett Davis Guthrie; Graham W. Glass, both of Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 0 days.

(21) Appl. No.: 09/175,079

(22) Filed: Oct. 19, 1998

(51) Int. Cl.[7] .................................................. G06F 9/54
(52) U.S. Cl. ....................................... 709/316; 709/203
(58) Field of Search ................................ 709/310–332, 709/203; 707/103

(56) References Cited

U.S. PATENT DOCUMENTS

| | | | |
|---|---|---|---|
| 5,577,251 A | 11/1996 | Hamilton et al. ............ | 395/671 |
| 5,781,633 A * | 7/1998 | Tribble et al. ............... | 713/167 |
| 5,793,965 A * | 8/1998 | Vanderbilt et al. .......... | 709/203 |
| 6,157,960 A * | 12/2000 | Kaminsky et al. .......... | 709/315 |
| 6,182,153 B1 * | 1/2001 | Hollberg et al. ............. | 709/315 |
| 6,182,154 B1 * | 1/2001 | Campagnoni et al. ...... | 709/315 |
| 6,182,155 B1 * | 1/2001 | Cheng et al. ................ | 709/315 |
| 6,230,160 B1 * | 5/2001 | Chan et al. .................. | 707/103 |

FOREIGN PATENT DOCUMENTS

| | | | |
|---|---|---|---|
| EP | 0 727 739 A1 | 8/1996 | ............. G06F/9/44 |
| GB | 2 326 255 A | 12/1998 | ............. G06F/9/46 |

OTHER PUBLICATIONS

"Improved Process for Visual Development of Client/Server Programs", XP–000772108, IBM Technical Disclosure Bulletin, vol. 41, No. 01 Jan. 1998, pp. 281–283.

"Passing Proxies as Parameters to Methods and Return Values from Methods", XP–000772037, IBM Technical Disclosure Bulletin, vol. 41, No. 01, Jan. 1998, pp. 89–92.

"Distributed Object Activation and Communication Protocols", IBM Techncial Disclosure Bulletin, vol. 37, No. 07, Jul. 1994, pp. 539–542.

* cited by examiner

*Primary Examiner*—St. John Courtenay, III
(74) *Attorney, Agent, or Firm*—Baker Botts L.L.P.

(57) ABSTRACT

A software system is disclosed which provides for dynamic generation of remote proxy classes at run time through a distributed object management system 16. The software system provides for a client system 14 and server system 12 which communicate via distributed object management system 16 which operates over a distributed computer network to allow communications between client system 14 and server system 12. Any inter-object communication will invoke a remote proxy generation control module 34 if a remote proxy class 23 does not already exist for the requested subject object 18. A remote proxy generation control module 34 is provided which first invokes reflection engine 36 to determine the applicable information of subject class 19. Next, a communication enabling module 40 determines and inserts the appropriate computer code to allow local object 20 to communicate with subject object 18 utilizing remote proxy object 22. After the system determines what information is required by remote proxy class 23, byte code generator 42 automatically generates the executable code containing remote proxy class 23. Finally, class loader 46 loads remote proxy class 23 onto the system and creates a new instance which is remote proxy object 22.

7 Claims, 2 Drawing Sheets

SYSTEM AND METHOD FOR DYNAMIC GENERATION OF REMOTE PROXIES

TECHNICAL FIELD OF THE INVENTION

This invention relates in general to the field of software systems, and more particularly to an improved system and method for dynamic generation of remote proxy classes within a distributed object management system.

BACKGROUND OF THE INVENTION

Object oriented programming is a method of programming which abstracts a computer program into manageable sections. The key to object oriented programming is the concept of encapsulation. Encapsulation is a method by which the subroutines, or methods, that manipulate data are combined with the declaration and storage of that data. This encapsulation prevents the data from arbitrarily being accessed by other program subroutines, or objects. When an object is invoked, the associated data is available and can be manipulated by any of the methods which are defined within the object to act upon the data. The basic component of encapsulation is a class. A class is an abstraction for a set of objects that share the same structure and behavior. An object is a single instance of a class that retains the structure and behavior of the class. Objects also contain methods which are the processes by which an object is instructed to perform some procedure or manipulation of data which it controls. Classes may also be characterized by their interface which defines the elements necessary for proper communication between objects.

Distributed computing allows an object on one computer system to seamlessly communicate with and manipulate an object contained in a second computer system when these computers are connected with a computer network. This second computer system may also be referred to as another address space. Sophisticated distributed computing systems have removed the communications burden from the computer programs, or objects in an object oriented programming environment, and placed it in a mid-level operating system which purpose is to manage communications across a computer network to facilitate a client's access to and manipulation of data contained on a server system, for example, a computer remote to the user in a different address space.

Distributed computing and object oriented programming have led to the development of distributed object management systems. When an object on a client computer system requests access to an object which exists only on a server computer system, the distributed object management system steps in to facilitate the communication between the two computer systems and, thus, between the two objects. The distributed object management system removes the requirement of the object on the client system communicating directly with the object on the server system. Instead, current distributed object management systems create a remote proxy object on the client system which models the interface of the object which exists on the server system. The client computer system which requested access to the remote object communicates with the remote proxy object which now exists on the client computer system. Therefore, the client computer system can operate as if it is communicating directly with a local object. The remote proxy object contains the necessary communications information to allow the client computer system to access and manipulate an object which actually exists on the server computer system. Remote proxies allow the client system to disregard the location of the requested object and the communication details.

A proxy is an object which has an interface and method list identical to another object. However, it does not contain the same detail computer programming. Instead it contains communications requirements which allow the proxy to communicate directly with another object without the knowledge of the first object. Proxies can be used to control access to certain objects. They may also be used to remove the labor of distributed processing communications from local objects. For example, if object A which resides on a first computer system needs to communicate with object B which resides on a second computer system, object A must know the location of object B and have the necessary computer code to initiate communications with object B located on the second computer system. A proxy for object B located on the first computer system allows object A to simply communicate with the proxy of object B as if object B resided on the same computer. The proxy for Object B has all the necessary information and computer code to communicate with the real object B on the second computer system. This type of proxy is known as a remote proxy since it exists on a computer system remote from the computer system which contains the requested object.

Systems heretofore known have required all possible remote proxies to be built when the software system is initially compiled and loaded onto a computer. This process can be very time consuming and the resultant remote proxies can require large amounts of computer storage. In addition, software system designers must predict every possible remote proxy which may be needed in the future so that it can be built when the software system is loaded. This process does not allow a system to adapt to its usage and environment.

SUMMARY OF THE INVENTION

Accordingly, a need has arisen for a software system in the area of distributed processing which reduces the time and expense required to build, load and store a distributed object management system.

According to one embodiment of the present invention, a software system is provided that comprises a client system and server system that communicate via a distributed computer network utilizing a distributed object management system. The distributed object management system also comprises a remote proxy generator to dynamically generate at run time remote proxy classes as needed for inter-object communications within the distributed computer network.

One important technical advantage of the present invention inheres in the fact that it decreases development time and increases developer productivity since the developer does not have to manually generate the remote proxy classes when the system is initially installed or when the subject class is modified in the future. Other technical advantages include reduced initial system build time and reduced disk storage space required to store the application programs.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
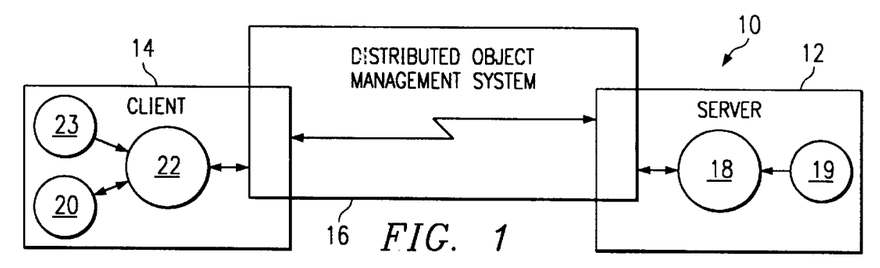
FIG. 1 is a block diagram illustrating a distributed object management system constructed according to the teachings of the present invention.

Referring to FIG. 1, a distributed processing computer system generally indicated at 10 is illustrated that comprises one or more server systems 12 and one or more client systems 14. The client/server computer systems allow for decentralized computing which includes the ability to manipulate data which is resident on a remote system. The server system 12 and client system 14 may comprise a personal computer, mini computer, main frame computer, or any other suitable computer type device. In a computer network environment, each computer is assigned a unique address. Therefore, if data, code or objects exist on a different computer, it is said to exist in a different address space.

The client system 14 requests access to data or services which may be contained on server system 12. Server system 12 may then process the request and approve access as requested by client system 14. Client system 14 is connected to server system 12 via a distributed object management system 16 operating across a computer network. The distributed object management system 16 handles the communications between client system 14 and server system 12. Without distributed object management system 16, distributed processing could not take place since client system 14 would not be able to determine the location of or obtain access to the requested data or services. The distributed object management system 16 may comprise Voyager, a distributed network communications system developed by ObjectSpace, Inc., CORBA (Common Object Request Broker Architecture), a technology for inter-object communications developed by a consortium of companies, DCOM, an inter-application communications system for networked computers developed by Microsoft, or any other suitable distributed object management system.

The present invention teaches a system and method for generating proxies on local systems to facilitate access to objects on remote systems. An object is an instance of a class within the programming methodology of object oriented programming. The present invention may be implemented using the Java language, developed by Sun Micro Systems, Inc., or any other suitable computer language.

When an object class source code description is created in the Java language, it is stored on a storage device as a .java file. Upon compilation, the object class executable code is represented as a class file on the storage device. When an object is needed, a new instance, as prescribed by the .class file is created, and it then is referred to as an object. Server system 12 may contain one or more subject objects 18 for which client system 14 may issue a request for access. In such a case, subject object 18 is the subject of client system's 14 request. Client system 14 may contain one or more local objects 20. It is important to note that local object 20 can itself be a subject object, and subject object 18 can itself be a local object depending on what computer, or address space, is making the request for access. For purposes of illustrating the present invention, local object 20 and subject object 18 exist in different address spaces. However, both local object 20 and subject object 18 could reside on the same computer and still invoke the system and method of the present invention. The present invention is utilized in all inter-object communications regardless of their relative locations.

Local object 20 may request access to subject object 18. This request invokes the distributed object management system 16. In order to isolate the distributed processing communication requirements from local object 20, a remote proxy object 22 may be created on client system 14. Remote proxy object 22 has an interface and list of methods identical to subject object 18. Remote proxy object 22 is so named since it may be remote from subject object 18, and it provides a local representative for an object which may reside in a different address space. Remote proxies in general are responsible for encoding a request and its arguments and for sending the encoded request to the subject object which may exist in a different address space. Remote proxies also hide the location of the subject object from the requesting local object. Therefore, any local object can assume, from an access point of view, that any object it needs is local. Local object 20 communicates with remote proxy object 22 which then communicates with subject object 18 via distributed object management system 16. By doing this, local object 20 is unconcerned with the location of subject object 18. As far as it is concerned, local object 20 is communicating directly with another local object, but in reality, it is communicating with subject object 18 which may reside in a different address space.

Currently, a system developer must anticipate all necessary remote proxies and create the remote proxy classes. Some distributed object management systems have a utility which augments the build process by allowing remote proxy classes to be built when the system is compiled. Although this process minimizes the system developer's effort, it still involves developer intervention, computer resources and time. Another disadvantage with current distributed object management systems is that these remote proxy classes must be kept in sync with the subject classes as the subject classes and interfaces are modified. Another disadvantage with current distributed object management systems is that all remote proxy classes must be stored on the computer and available for use when needed. This creates high overhead in developer effort, computer storage and processing requirements.

In contrast, a system constructed using the present invention dynamically generates remote proxy classes as needed at run-time. There are several advantages of this method. The primary advantage is reduced system development time since the system developer does not have to manually generate remote proxy classes when the system is initially compiled or manually regenerate remote proxy classes each time a subject object class is modified. The system of the present invention also reduces computer program storage requirements since remote proxy classes are not a permanent part of the operating environment. It also minimizes compile and load time for the computer program since remote proxy classes do not have to be generated at compile and load time. In order to optimize system performance, generated remote proxy classes remain in memory until the distributed object management system is shut down.

Referring again to FIG. 1, the dynamic generation of remote proxies may be accomplished by parsing the .class or .java file for subject object 18 and creating a .java file for remote proxy object 22 which contains the interfaces and methods of the subject object 18. The Java compiler may then be invoked to compile the .java file into a .class file for remote proxy object 22. The compiled .class file can then be loaded into the computer system via a class loader which is a standard element in a Java environment. A .class file must be loaded before it is available for use by distributed processing computer system 10. Once the .class file is loaded, a new instance of the compiled .class file may be created which will be remote proxy object 22.

The process of parsing the subject object 18 .class (subject class 19) or .java file, creating a source code file for remote proxy class 23, compiling, loading, and creating a new instance may be excessively slow at run-time. In order to address this issue, a reflection process may be used on subject object 18 to determine its name, interfaces and list of methods and then to directly generate the byte codes into a .class file, subject class 19. The byte codes are the executable code stored in a .class file. The .class file can then be loaded into the computer system with the class loader. This embodiment eliminates the need to parse the .class file, create a .java source code file, and shell out the .java file to a compiler since the code generation process occurs as part of the dynamic generation of remote proxies. This entire process of dynamic generation of remote proxies will be discussed in detail with reference to FIGS. 2, 3 and 4.

Figure 2:
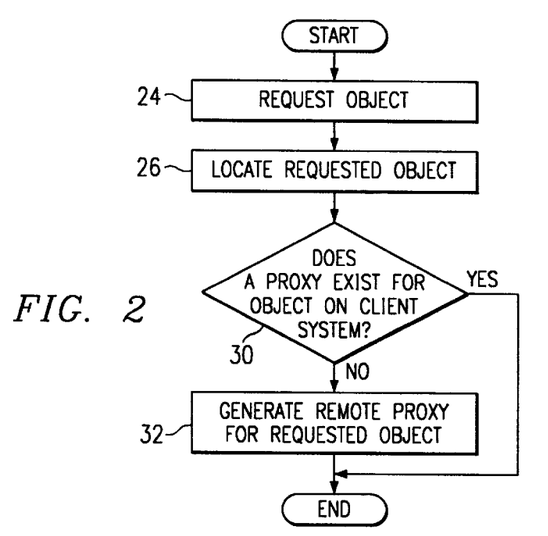
FIG. 2 illustrates a flow chart of a method of determining when dynamic generation of remote proxy classes is needed according to the teachings of the present invention.

Referring to FIG. 2, the process of determining if a remote proxy is necessary is invoked via a request from local object 20 for access to subject object 18. The method begins at step 24 where local object 20 on client system 14 requests access to subject object 18 on server system 12. This request could be for any object whether it is local or remote and in a different address space. The system of the present invention generates and utilizes remote proxy objects in all inter-object communication to provide additional processing support. Thus, any communication between objects, regardless of their location, utilizes remote proxy objects. These remote proxy objects act as a middle man between the requested object and the requesting object to provide additional processing functionality which may include increased security.

Referring again to FIG. 2, the method then proceeds to step 26 where the requested object is located on either client system 14 or server system 12. The method proceeds to step 30 where a determination is made regarding the need for a remote proxy class. If remote proxy class 23 already exists on client system 14, then the method terminates since remote proxy classes are not removed from client system 14 until the distributed object management system 16 is shut down. However, if remote proxy class 23 does not exist on client system 14, the method then proceeds to step 32 where remote proxy class 23 is generated on client system 14 based on the name, interfaces and methods of subject object 18 which may reside on either server system 12 or client system 14. The method for generating these remote proxies is described in detail with reference to FIGS. 3 and 4.

Figure 3:
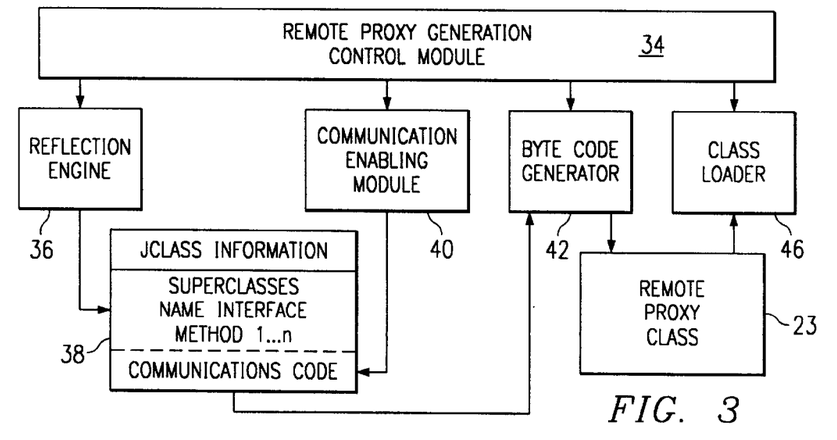
FIG. 3 is a block diagram illustrating dynamic generation of remote proxy classes according to the teachings of the present invention.

FIG. 3 is a functional diagram of the portions of distributed object management system 16 that are used to create remote proxy classes as necessary. Remote proxy generation control module 34 is invoked at step 32 in FIG. 2. When the distributed object management system 16 invokes the remote proxy generation control module 34, the method described previously has already determined that the remote proxy class 23 does not yet exist on client system 14. Remote proxy generation control module 34 generates remote proxy 22 on client system 14 so local object 20 can communicate with subject object 18 via distributed object management system 16.

As previously discussed, in object oriented programming, an object is an instance of a class. Classes may be defined in a class hierarchy where each class inherits the attributes of all of its ancestors. Inheritance is a concept which maps related classes onto each other in a hierarchical way. This allows a descendant of a class to inherit all of its variables and methods from its ancestors as well as create its own. The immediate ancestor of a class is known as its superclass. Therefore, in order to determine all of a class's attributes, all of the class's ancestors, or superclasses, must be determined.

To fully define a remote proxy for a subject object, remote proxies must be generated for each of the subject object's superclasses. By generating these superclass remote proxies, the remote proxy for subject object will inherit all of the variables and methods of its ancestors, or superclasses. An alternative to generating superclass remote proxies includes adding all of the superclass methods and interface requirements to the remote proxy class. By adding the superclass information to the remote proxy class, the need for generating superclass remote proxies is eliminated.

Referring again to FIG. 3, remote proxy generation control module 34 first invokes reflection engine 36 to determine information regarding subject class 19. The process of reflection operates on subject class 19 which is the Java .class file for subject object 18. Although for illustrative purposes, subject object 18 and its Java .class file, subject class 19, exist on server system 12, subject class 19 could exist on either client system 14 or server system 12. Therefore, the dynamic generation of remote proxy classes as described in the present invention could take place on either client system 14 or server system 12.

Reflection is a process that determines what an object can do, how it is defined, and how it communicates with other objects. Reflection mirrors the public view of an object to collect information to facilitate the creation of proxies which resemble objects on the public view, but are very different internally, or privately. The public view of an object represents the information external objects must know in order to communicate with the first object. Proxies need to be reflections, or duplicates on the surface, of objects since proxies perform specific tasks such as controlling access to or communications with the objects they represent. Thus, proxies need to look like the object on the outside, but on the inside, proxies contain unique computer code to accomplish their assigned function. The reflection process is only concerned with determining the public view of an object. Therefore, the information determined by the reflection process includes the following: name; list of implemented interfaces; list of methods; and superclass information.

Continuing with FIG. 3, reflection engine 36 issues queries against subject class 19, which is the .class file for subject object 18, to determine each of subject class 19 superclasses, its name, its interfaces, and each of its methods. The results of these queries are temporarily stored within remote proxy generation control module 34 as JClass information 38. JClass information 38 is a temporary storage area which defines the name, superclasses, interfaces, and methods of subject class 19. JClass information 38 would also include the name, interfaces, and methods of each of subject class 19 superclasses.

If subject class 19 has superclasses, a remote proxy may be first generated for each superclass using the system and method described with reference to the present invention. After the superclass remote proxies are generated, JClass information 38 contains the name, interface, and list of methods for subject class 19. An alternate methodology for providing superclass methods and interfaces for the remote proxy class is to add all superclass method and interface information to the remote proxy class. By doing this, the need for separate superclass remote proxies is eliminated.

Once the name, interface, methods, and superclass information are determined for subject class 19, a communication enabling module 40 adds to JClass information 38 the computer code necessary for remote proxy object 22 to communicate with subject object 18 via distributed object management system 16. The communication enabling module 40 inserts the computer code into JClass information 38 which is the definition of all the information that remote proxy object 22 needs to function within distributed object management system 16.

Since a remote proxy's purpose is to communicate with a subject object which may exist either in a different address space or in the same address space, the remote proxy contains essentially only the following information: interfaces identical to the subject object; a list of methods identical to the subject object; and computer code necessary for the remote proxy to communicate with the subject object. In an alternate embodiment of the present invention, the remote proxy would contain all of the information mentioned above and the interfaces and methods of all of the subject object's superclasses.

At this point, JClass information 38 contains subject object's 18 name, interfaces, methods, and the computer code necessary for communications within distributed object management system 16. JClass information 38 could also contain the superclass information for subject object 18. The next function invoked by remote proxy generation control module 34 is byte code generator 42. The purpose of byte code generator 42 is to directly generate the executable code corresponding to JClass information 38. JClass information 38 is the definition of the Java class of which remote proxy object 22 is an instance. That is, JClass information 38 is the definition of remote proxy class 23. Byte code generator 42 reviews JClass information 38 and generates the corresponding byte codes, or executable code, into remote proxy class 23 which is a Java .class file. As previously discussed, a Java .class file is executable code which defines a Java class.

Byte code generator 42 is a collection of Java classes which are capable of taking the description of the needed proxy class in JClass information 38 and directly generating the executable Java code in memory. The function of byte code generator 42 is similar to that of a Java compiler. Like a Java compiler, byte code generator 42 generates executable Java code. However, the inputs are very different. A compiler requires a source code file which is a string of bytes which is the sequence of statements for a Java object definition. The string of bytes is parsed by the Java compiler and translated into executable Java code. In contrast, byte code generator 42 takes general information regarding the needed Java object and directly generates executable Java code without the need for the intermediate step of creating a Java source file. This technique yields considerable time savings since several steps are omitted. For example, like a Java compiler, byte code generator 42 generates a hexadecimal "CAFEBABE" to indicate to the Java virtual machine that a Java .class file begins at that point in memory. Byte code generator 42 is constructed in such a way that the byte codes are generated in the sequence required by the Java virtual machine.

For each Java construct, byte code generator 42 writes the appropriate header information and hexadecimal byte codes representing the Java construct into computer memory. Thus, there is a block of code, or hexadecimal bytes, for each Java construct. As described above, JClass information 38 contains the computer code necessary for communications within distributed object management system 16. Byte code generator 42 translates this communications information into byte codes recognizable to the Java virtual machine. When byte code generator 42 terminates, the string of hexadecimal bytes necessary to define the proxy class has been stored in memory as remote proxy class 23 which is an executable Java .class file. Remote proxy class 23 has a unique name which is derived from subject class 19 name. For example, if subject class 19 is named "Foo.class", its remote proxy class 23 name would be "Foo_Proxy.class".

Before remote proxy class 23 can be used, it must be loaded onto client system 14 utilizing a class loader 46. Class loader 46 may comprise any number of suitable programs which exist in typical object oriented programming environments. The class loader 46 will then create remote proxy object 22 which is an instance of remote proxy class 23 generated by byte code generator 42.

Figure 4:
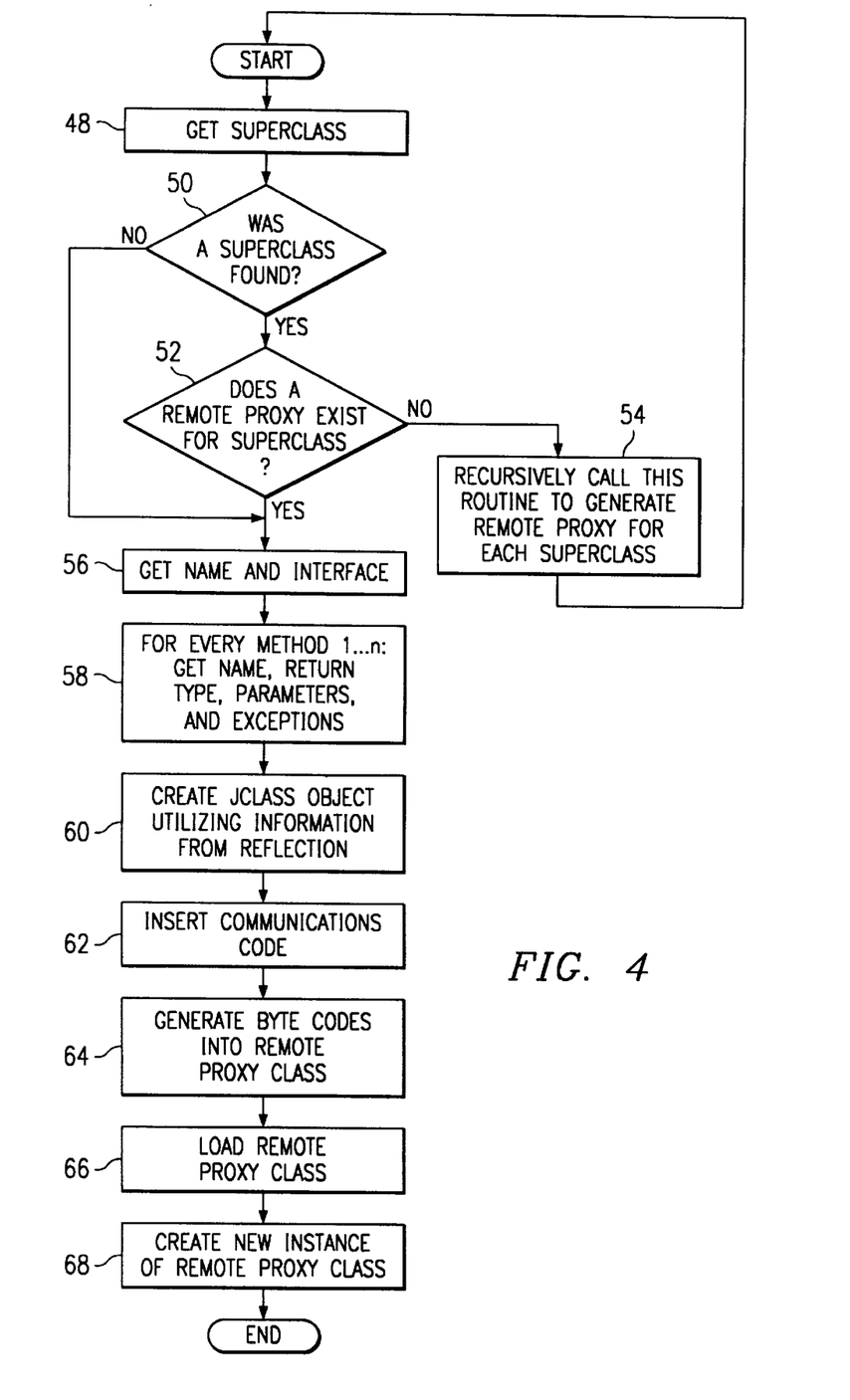
FIG. 4 illustrates a flow chart of a method of dynamically generating remote proxy classes according to the teachings of the present invention.

FIG. 4 is a flow diagram that illustrates the process of generating a remote proxy when invoked by step 32 in FIG. 2 and as represented in general by the block diagram in FIG. 3. The method begins at step 48 where the reflection engine 38 queries subject class 19 to determine its superclass. The method then proceeds to step 50 where a determination is made regarding the existence of a superclass for subject class 19. If a superclass is found for subject class 19, then the method proceeds to step 52 where a determination is made regarding the existence of the remote proxy class on client system 14 representing subject class' 19 superclass. If a remote proxy class does not exist for subject class' 19 superclass, the method proceeds to step 54 where the remote proxy class is generated for subject class' 19 superclass by recursively invoking the remote proxy generation control module 34. Thus, step 54 recursively invokes the method illustrated in FIG. 4.

Referring to step 52, if the remote proxy class does exist on client system 14 for subject class' 19 superclass, then the method proceeds to step 56 (described below) since remote proxy classes already exist for all of subject object's 18 superclasses.

In an alternate embodiment of the present invention, instead of recursively generating remote proxy classes for each of subject class 19 superclasses, the interfaces and methods of each of subject class 19 superclasses are stored in JClass information 38 and are later used in the generation of remote proxy class 23. In the alternate embodiment, steps 48–54 would not exist in their current form. Instead, these steps would consist of determining the names, interfaces, and methods of all of subject class 19 superclasses and storing the information in JClass information 38.

Referring to step 50 if a superclass does not exist for subject object 18, then the method proceeds to step 56 where reflection engine 36 queries subject class 19 to determine subject class' 19 name and interface. The method then proceeds to step 58 where reflection engine 38 queries subject class 19 regarding its methods. Reflection engine 36 issues queries for each of subject class' 19 methods until all methods are determined. For each of subject class' 19 methods, the software system determines the method name, return type, parameters, and exceptions and stores the information in JClass information 38.

The method then proceeds to step 60 where reflection engine 36 creates JClass information 38 from the name, interface, and methods information determined in steps 56 and 58. The method then proceeds to step 62 where communication enabling module 40 inserts in JClass information 38 the computer code, in the form of an expression tree, necessary for remote proxy object 22 to communicate with subject object 18 via distributed object management system 16.

The method then proceeds to step 64 where byte code generator 42 generates the executable code representing JClass information 38 into remote proxy class 23. The method then proceeds to step 66 where class loader 46 loads remote proxy class 23 onto client system 14 where it is now available for use. The method then proceeds to step 68 where remote proxy object 22 is generated as a new instance of remote proxy class 23 which was loaded in step 66.

According to the teachings of the present invention, a software system is provided that allows for the dynamic generation of remote proxy classes. The advantages of dynamic generation of remote proxy classes includes reduced system development time, reduced system compile and build time, reduced system modification time, and reduced system storage requirements. Remote proxy classes are generated as needed at run time. Once a remote proxy class is generated, it continues to exist until the system is shut down. Therefore, the software system is only required to generate a particular remote proxy class once during a session of the software system.

Although the present invention and its advantages have been described in detail, it should be understood that various changes, substitutions and alterations can be made therein without departing from the spirit and scope of the invention as defined by the appended claims.

What is claimed is:

1. The software system, wherein the remote proxy generator further comprises:
    a reflection engine operable to determine the name, interfaces, methods and superclass information of a requested object within the object oriented distributed processing environment for use in creating the remote proxy class;
    a communications enabling module operable to aid in creating the remote proxy class by inserting within the remote proxy class computer code required for communications between objects within the object oriented distributed processing environment; and
    a byte code generator operable to generate the executable computer code representing the determined name, interfaces, methods, superclass information and communications computer code for the remote proxy class.

2. The software system of claim 1, further comprising a determination module operable to determine if a remote proxy class needs to be generated in response to a request for services from the client system by determining if a request for services requires access to an object in a different address space and by determining if a remote proxy class has already been generated for the object existing in a different address space.

3. The software system of claim 1, further comprising a determination module operable to determine if a remote proxy class needs to be generated in response to a request for access to a requested object by determining if a remote proxy class has already been generated for the requested object.

4. A software system for dynamic generation of remote proxy classes within an object oriented distributed processing environment, comprising:
    a client system operable to request services from a server system located remotely from the client system and communicating with the client system using a distributed computer network;
    a distributed object management system operating over the distributed computer network and operable to allow communications between the client system and the server system;
    a determination module operable to determine if a remote proxy class needs to be generated in response to a request for access to a requested object by determining if a remote proxy class has already been generated for the requested object;
    a reflection engine operable to determine the name, interfaces, methods, and superclass information of a requested object within the object oriented distributed processing environment for use in creating the remote proxy class;
    a communications enabling module operable to aid in creating the remote proxy class by inserting within the remote proxy class computer code required for communications between objects within the object oriented distributed processing environment;
    a byte code generator operable to generate the executable computer code representing the determined name, interfaces, methods, superclass information, and communications computer code for the remote proxy class; and
    a class loader operable to load the generated remote proxy classes onto the client system.

5. The method of claim 4, wherein the step of generating a remote proxy class further comprises the steps of:
    reflecting the requested object requiring a remote proxy class to determine the requested object's name, interfaces, methods, and superclass information for use in creating the remote proxy class;
    inserting within the remote proxy class the computer code necessary for communications between a remote proxy object on the client system and the requested object within the object oriented distributed processing environment; and
    generating the executable code representing the determined name, interfaces, methods, superclass information, and communications computer code for the remote proxy class.

6. The method of claim 4, further comprising determining if a remote proxy class is required in response to a request for services from the client system to the server system by determining if a request for services requires access to an object in a different address space and by determining if a remote proxy class has already been generated on the client system for the object existing in a different address space.

7. A method for dynamic generation of remote proxy classes within an object oriented distributed processing environment, comprising:
    providing a client system operable to request services from a server system located remotely from the client system and communicating with the client system using a distributed computer network;
    providing a distributed object management system operable to allow communications between the client system and the server system;
    determining if a remote proxy class is required in response to a request for services from the client system by determining if a remote proxy class has already been generated on the client system for the requested object;
    reflecting the requested object requiring a remote proxy class to determine the requested object's name, interfaces, methods, and superclass information for use in creating the remote proxy class;
    inserting within the remote proxy class the computer code necessary for communications between a remote proxy object on the client system and the requested object within the object oriented distributed processing environment;

generating the executable code representing the determined name, interfaces, methods, superclass information and communications computer code for the remote proxy class; and utilizing the class loader to load the generated remote proxy classes onto the client system.

* * * * *

UNITED STATES PATENT AND TRADEMARK OFFICE
CERTIFICATE OF CORRECTION

PATENT NO. : 6,385,661 B1
DATED : May 7, 2002
INVENTOR(S) : Rhett Davis Guthrie et al.

It is certified that error appears in the above-identified patent and that said Letters Patent is hereby corrected as shown below:

<u>Column 9,</u>
Line 26, after "What is claimed is:", delete Claims "1, 2 and 3" and insert -- 1.   A software system for dynamic generation of remote proxy classes within an object oriented distributed processing environment, comprising:
 a client system operable to request services from a server system located remotely from the client system and communicating with the client system using a distributed computer network;
 a distributed object management system operating over the distributed computer network and operable to allow communications between the client system and the server system; and
 a remote proxy generator operating within the distributed object management system and operable to dynamically generate at run time remote proxy classes as needed by the distributed
 object management system to facilitate communications within the object oriented distributed processing environment;
  wherein the remote proxy generator further comprises:
   a reflection engine operable to determine the name, interfaces, methods and superclass information of a requested object within the object oriented distributed processing environment for use in creating the remote proxy class;
   a communications enabling module operable to aid in creating the remote proxy class by inserting within the remote proxy class computer code required for communications between objects within the object oriented distributed processing environment; and
   a byte code generator operable to generate the executable computer code representing the determined name, interfaces, methods, superclass information and communications computer code for the remote proxy class.

UNITED STATES PATENT AND TRADEMARK OFFICE
CERTIFICATE OF CORRECTION

PATENT NO.    : 6,385,661 B1
DATED         : May 7, 2002
INVENTOR(S)   : Rhett Davis Guthrie et al.

It is certified that error appears in the above-identified patent and that said Letters Patent is hereby corrected as shown below:

2. A software system for dynamic generation of remote proxy classes within an object oriented distributed processing environment, comprising:
    a client system operable to request services from a server system located remotely from the client system and communicating with the client system using a distributed computer network;
    a distributed object management system operating over the distributed computer network and operable to allow communications between the client system and the server system; and a remote proxy generator operating within the distributed object management system and operable to dynamically generate at run time remote proxy classes as needed by the distributed object management system to facilitate communications within the object oriented distributed processing environment;
    a determination module operable to determine if a remote proxy class needs to be generated in response to a request for services from the client system by determining if a request for services requires access to an object in a different address space and by determining if a remote proxy class has already been generated for the object existing in a different address space.

3. A software system for dynamic generation of remote proxy classes within an object oriented distributed processing environment, comprising:
    a client system operable to request services from a server system located remotely from the client system and communicating with the client system using a distributed computer network;
    a distributed object management system operating over the distributed computer network and operable to allow communications between the client system and the server system; and
    a remote proxy generator operating within the distributed object management system and operable to dynamically generate at run time remote proxy classes as needed by the distributed object management system to facilitate communications within the object oriented distributed processing environment;
    a determination module operable to determine if a remote proxy class needs to be generated in response to a request for access to a requested object by determining if a remote proxy class has already been generated for the requested object.

UNITED STATES PATENT AND TRADEMARK OFFICE
CERTIFICATE OF CORRECTION

| | | |
|---|---|---|
| PATENT NO. | : 6,385,661 B1 | |
| DATED | : May 7, 2002 | |
| INVENTOR(S) | : Rhett Davis Guthrie et al. | |

It is certified that error appears in the above-identified patent and that said Letters Patent is hereby corrected as shown below:

Column 10,
Line 22, delete Claims "5 and 6", and insert

-- 5.  A method for dynamic generation of remote proxy classes within an object oriented distributed processing environment, comprising:

providing a client system operable to request services from a server system located remotely from the client system and communicating with the client system using a distributed computer network;

providing a distributed object management system operable to allow communications between the client system and the server system; and generating a remote proxy class on the client system when an object on the client system requests access to another object within the object oriented distributed processing environment and a remote proxy class does not exist on the client system for the requested object;

wherein the step of generating a remote proxy class further comprises the steps of:

reflecting the requested object requiring a remote proxy class to determine the requested object's name, interfaces, methods, and superclass information for use in creating the remote proxy class;

inserting within the remote proxy class the computer code necessary for communications between a remote proxy object on the client system and the requested object within the object oriented distributed processing environment; and generating the executable code representing the determined name, interfaces, methods, superclass information, and communications computer code for the remote proxy class.

UNITED STATES PATENT AND TRADEMARK OFFICE
CERTIFICATE OF CORRECTION

PATENT NO.   : 6,385,661 B1
DATED        : May 7, 2002
INVENTOR(S)  : Rhett Davis Guthrie et al.

It is certified that error appears in the above-identified patent and that said Letters Patent is hereby corrected as shown below:

6.   A method for dynamic generation of remote proxy classes within an object oriented distributed processing environment, comprising:
   providing a client system operable to request services from a server system located remotely from the client system and communicating with the client system using a distributed computer network;
   providing a distributed object management system operable to allow communications between the client system and the server system; and
   generating a remote proxy class on the client system when an object on the client system requests access to another object within the object oriented distributed processing environment and a remote proxy class does not exist on the client system for the requested object;
   determining if a remote proxy class is required in response to a request for services from the client system to the server system by determining if a request for services requires access to an object in a different address space and by determining if a remote proxy class has already been generated on the client system for the object existing in a different address space. --

Signed and Sealed this

Twelfth Day of November, 2002

*Attest:*

*Attesting Officer*

JAMES E. ROGAN
*Director of the United States Patent and Trademark Office*